United States Patent [19]

Gallagher et al.

[11] Patent Number: 5,627,891
[45] Date of Patent: May 6, 1997

[54] TUBE MOUNTED TELEPHONE HANDSET IN AN ARMREST

[75] Inventors: Patrick M. Gallagher, Seattle, Wash.; James B. Robertson, Aptos; David P. Moriconi, Ben Lomond, both of Calif.

[73] Assignee: Claircom Communications Group, Inc., Seattle, Wash.

[21] Appl. No.: 402,094

[22] Filed: Mar. 10, 1995

[51] Int. Cl.$^6$ ........................................ H04M 1/00
[52] U.S. Cl. ........................ 379/455; 379/446; 379/454
[58] Field of Search ............................ 379/446, 449, 379/455, 454, 426, 447, 428; 455/89, 90, 128

[56] References Cited

U.S. PATENT DOCUMENTS

| | | | |
|---|---|---|---|
| 5,109,412 | 4/1992 | Hollowed et al. | 379/455 |
| 5,189,698 | 2/1993 | Hakanen | 379/455 |
| 5,410,597 | 4/1995 | Kepley et al. | |

FOREIGN PATENT DOCUMENTS

| | | | |
|---|---|---|---|
| 4-37237 | 2/1992 | Japan | 379/428 |

*Primary Examiner*—Thomas W. Brown
*Assistant Examiner*—Jack Chiang
*Attorney, Agent, or Firm*—Knobbe, Martens, Olson & Bear, LLP

[57] ABSTRACT

A storage assembly for an electronic device, such as a telephone handset. The storage assembly is comprised of a tube housing, carrier tray and tray locking mechanism. The tube housing receives a telephone handset forcing the carrier tray to the full aft and locked position. At this point, the telephone handset is completely stored inside the tube housing. A push-button release mechanism provides the ability for the user to eject the telephone handset from the tube when needed. The entire tube housing is designed to fit in the armrest of a seat on an airplane, train, car or any other desired seat. This allows storage of the telephone handset while maximizing the available space immediately around the seat used for other purposes.

18 Claims, 3 Drawing Sheets

TUBE MOUNTED TELEPHONE HANDSET IN AN ARMREST

FIELD OF THE INVENTION

The present invention relates to devices designed to store, hold and make available telephone handsets for use by passengers in aircraft, trains, buses, automobiles or any location where saving space is desirable. In particular, the present invention relates to a handset storage system wherein the receptacle defines a handset storage area defining a tubular configuration.

BACKGROUND OF THE INVENTION

The advance of cellular technology has seen a significant increase in the number portable telephones in use. Many modes of transportation, such as aircraft, trains, buses or automobiles can be equipped with telephones for passenger use. One common factor in such telephone applications is the need to limit the amount of space required for storage of the telephones when not in use.

Previously, when a passenger boarded an aircraft, that passenger was incommunicado with the rest of the world until the plane landed. This presented difficulties for many people that needed to maintain contact with business associates, family or friends on the ground. The first aircraft equipped with telephones available for passenger use generally had a limited number of such telephones, located in common areas in the cabin. This was an advantage over having no telephones or communication options, but still presented limited alternatives if several people needed to make a call simultaneously. More recently, aircraft telephones have been installed in seat backs providing at least one phone for a group of adjacent seats. While this alleviated the situation to a degree, there was still no provision to provide for two passengers in the same group of seats to simultaneously use a telephone.

One inherent disadvantage of human transportation systems such as aircraft is the limited amount of space available. With the increasing technology available and the demands of the flying public, airlines are trying to fully equip airplanes with a wide variety of passenger comfort and convenience items. Some examples are video screens for inflight entertainment and passenger control units, such as flight attendant call buttons. The more prevalent these items become on aircraft, the greater the need for thoughtful space organization. Because one logical location for video screens is the seat back, an alternative location to store the telephone handset is desired.

Similar needs are presented on a variety of transportation platforms, including automobiles, trains and buses. All of these platforms are limited in the amount of space available to an occupant.

What is needed is a system that allows telephones to be available to each passenger on an aircraft or other mode of transportation while minimizing the amount of space required for storage of the telephone handset. This will allow the full convenience a telephone provides without surrendering the space necessary for other passenger convenience systems.

SUMMARY OF THE INVENTION

The current invention achieves these goals by storing a telephone handset in the armrest of a seat. A substantially rectangular housing including a torpedo type of tube for receiving a handset is designed to fit inside the armrest. A spring biased carrier tray travels along spring channels that extend forward and aft inside the housing. When the telephone handset is inserted in the housing, the handset contacts the carrier tray and forces the tray towards the rear of the housing. At the rear of the housing, an internal spring loaded locking mechanism secures the handset for storage.

One end of a telephone cord is attached to the rear of the handset, and the remainder of the cord is preferably wound around a spring biased take-up reel of a type presently commercially available, and which is located in the armrest behind the tube housing. Electronic connections for the telephone are located at the take-up reel. The take-up reel is designed to automatically wind the cord when a pulling force is removed.

When the telephone is not in use, the handset is stored in the tubular receptacle of the housing, and thus space available to the passenger is not impacted by the presence of the telephone. To use the telephone, the passenger only needs to push a button to unlock the telephone handset from the housing. The handset is then removed forwardly from the housing and may be operated as normal. When the telephone handset is removed from the tube housing, the force used to remove the handset also provides the pulling force necessary to unwind the cord from the reel. The cord then travels along the inside of the tube housing, extending out the front end to the telephone handset.

Placing the housing in the armrest of a passenger seat maximizes space available for other passenger convenience items. Seat backs are then available to mount video screens to accommodate in-transit entertainment. By mounting the housing in an automobile, the convenience of a cellular telephone is provided without sacrificing the floor or dash space previously required to store the telephone.

The telephone handset is locked in the housing when not in use, thereby preventing potential hazards. In an automobile, a prior art cellular telephone that is not in use may be rested on the passenger seat or the floorboard. In this position, a sudden stop can cause the telephone to become a projectile. A similar hazard could occur during turbulent flight in an aircraft. The unique storage and locking mechanism of the present invention ensures that the telephone handset will remain securely in the housing whenever it is not in use.

This invention capitalizes on previously unused space to provide for a more efficient, safe and better organized system of passenger convenience.

DETAILED DESCRIPTION OF THE PREFERRED EMBODIMENTS

Figure 1:
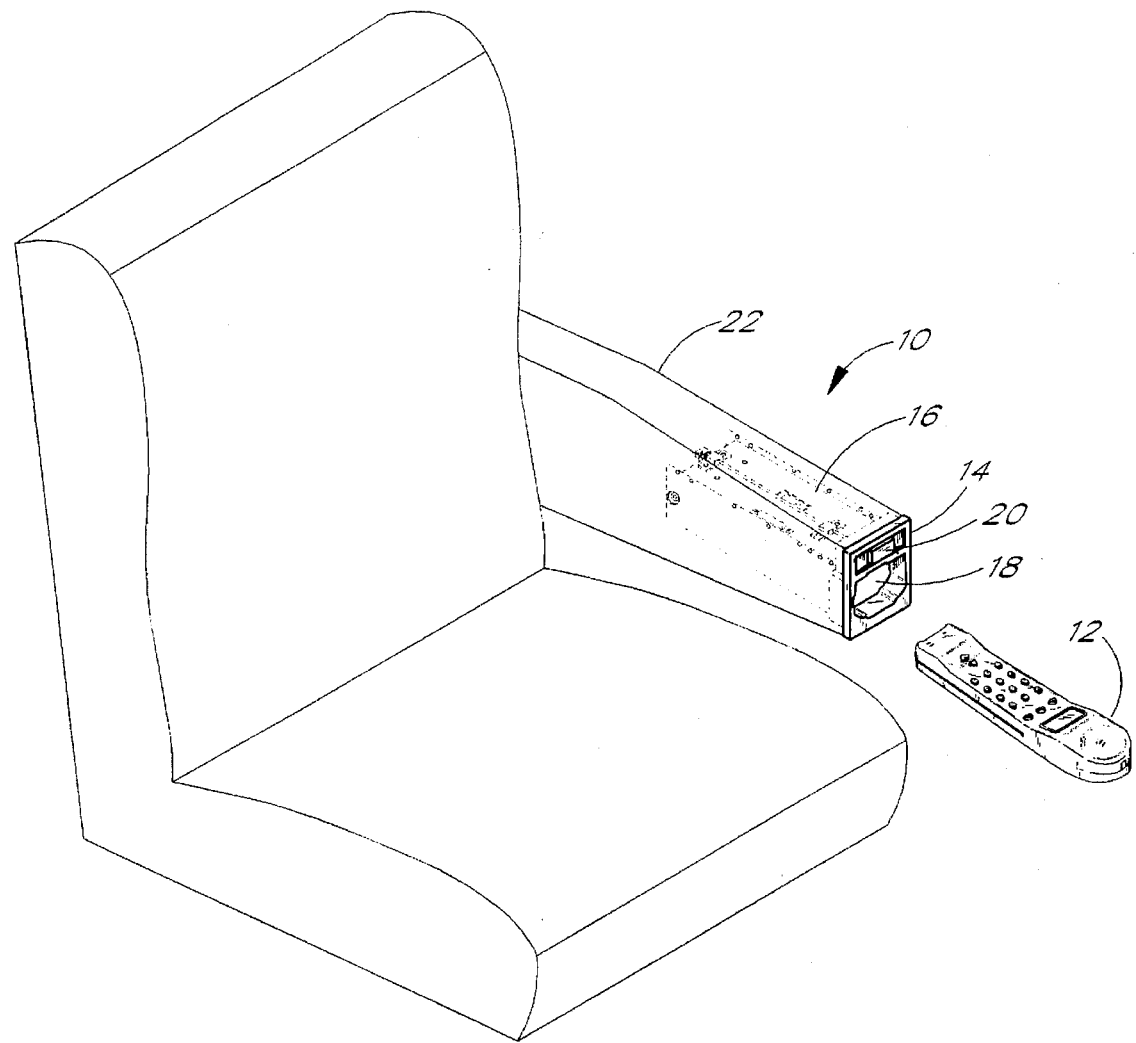
FIG. 1 is a perspective view of one presently preferred embodiment of the tube holder and telephone handset of the present invention as installed in a seat armrest.

Referring first to FIG. 1, there is shown the combination of a receptacle 10, configured in the form of a torpedo tube and a telephone handset 12. The receptacle 10 is composed of a front face 14 connected to a forward end of a tube housing 16. The tube housing 16 is configured in an elongated rectangular shape. The tube housing 16 has a tubular shaped interior configured to receive and store the telephone handset 12. The front face 14 includes an entrance opening 18 whose circumference defines an irregular shape that functions as a guide so as to permit passage of the telephone handset 12 therethrough only when the handset 12 is positioned in a desired orientation.

The telephone handset 12 is configured with irregular features corresponding to those of the opening 18, so as to extend through the entrance opening 18 in mating relationship therewith. The telephone handset 12 slides completely inside the tube housing 16 and is locked in place by a mechanism described hereafter with reference to FIG. 3. To retrieve the handset 12, a release button 20, positioned on the front face 14, is depressed. This allows the telephone handset 12 to be removed from the receptacle 10 as will be described in further detail hereafter.

The receptacle 10 of FIG. 1 is of a design and size to fit into an armrest 22 of a seat. In the preferred embodiment, the tube housing 16 is placed longitudinally in a hollowed out portion of an aircraft passenger seat armrest 22. Threaded holes in the bottom of the tube housing 16 receive screws to secure the receptacle 10 in the armrest 22. Of course, the invention can be used with any type of seat armrest such as an automobile or train without changing the spirit of the invention. The front face 14 is positioned on the tube housing 16 so that when the tube housing 16 is installed in the armrest 22, the front face 14 is in substantial planar alignment with the surrounding portion of the front face of the armrest 22. Thus, when the telephone handset 12 is inserted into the receptacle 10, both the receptacle 10 and the handset 12 are stored within the armrest 22, thereby requiring no additional seat area. This technique enables each seat to be equipped with a telephone handset, without impacting areas needed for items such as inflight entertainment units.

Figure 2:
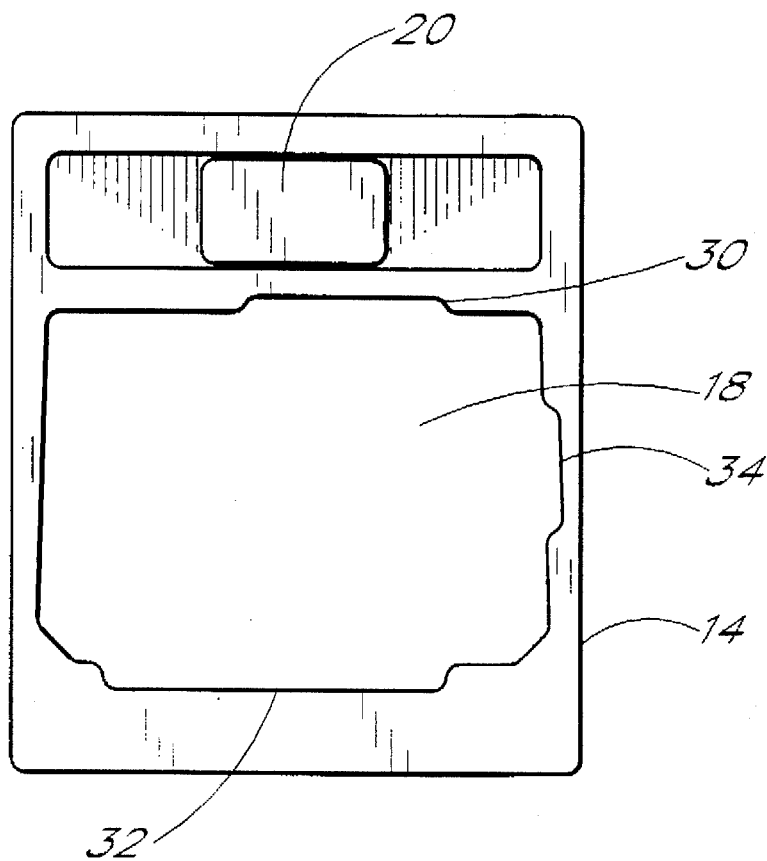
FIG. 2 is a front elevational view of one presently preferred embodiment of the tube holder of the present invention.

FIG. 2 illustrates the front face 14 of the receptacle 10, including the release button 20 which is positioned thereon. When the telephone handset 12 is locked in place, depressing the release button will unlock the handset 12 and allow the passenger to fully remove the handset 12 from the receptacle 10. In the illustrated embodiment, the opening 18 is located below the release button 20. As was previously indicated, the opening 18 is configured so as to accept the telephone handset 12 in only one orientation. In the preferred embodiment, that orientation is with the ear piece and the mouth piece of the telephone handset 12 facing upwardly. This design of the opening 18 prevents the user from inserting the telephone handset 12 into the receptacle 10 in the wrong configuration, which could cause the handset 12 to get stuck in the housing 16 or prevent proper alignment of the telephone handset 12 on the carrier tray 40. In the preferred embodiment, the opening 18 is generally rectangular in shape, with expansions on the top 30, bottom 32 and side 34 of the opening 18. The handset 12 is configured with corresponding expansion lines to define a mating relationship with the opening 18. However, the opening and receptacle can be easily adapted for any other telephone handset.

Figure 3:
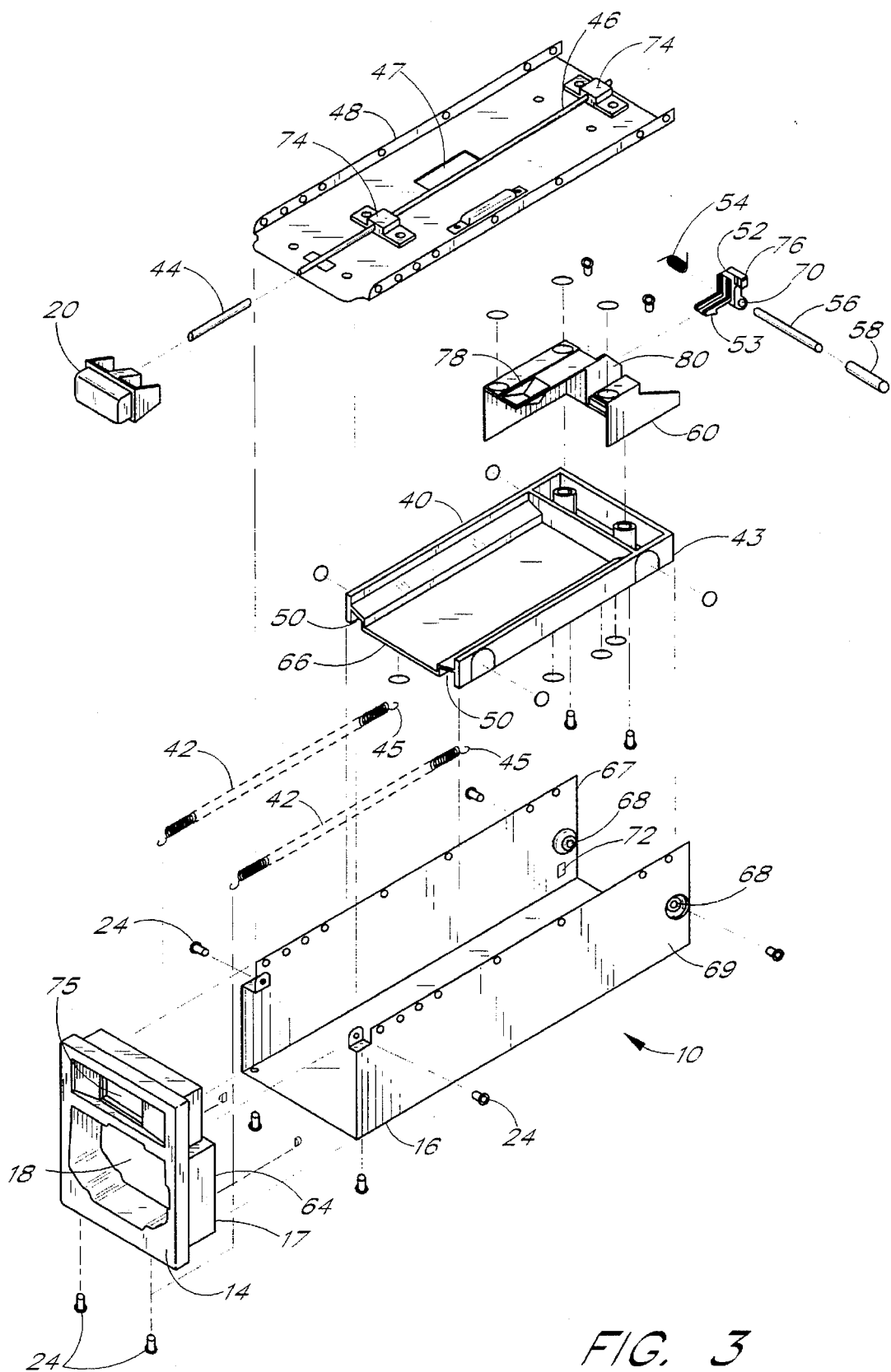
FIG. 3 is an exploded perspective view of one presently preferred embodiment of the tube holder of the present invention.

FIG. 3 provides a detailed exploded view of the components of the receptacle 10. In particular, the front face 14, having an opening 18 connects to a front edge of the tube housing 16. The front face 14 extends about the periphery of the front edge and is secured to the tube housing 16 on the side and bottom by screws 24. Connected to a back edge 17 of the front face 14 are a pair of springs 42. The springs 42 run parallel to each other longitudinally along the inside bottom portion of the tube housing 16. The springs 42 fit inside corresponding spring channels 50 that run underneath both edges of a carrier tray 40. At the rear edge 43 of the carrier tray 40, the springs attach using hooks 45 onto the bottom rear edge 43 of the carrier tray 40.

The carrier tray 40 is designed to slide along the spring channels 50 on the inside of the tube housing 16. A locking section 60 is attached to the aft portion of the carrier tray 40. A portion of the locking section 60 that extends forward to the front of the receptacle 10 defines a handset clip 78 used to hold the telephone handset 12 securely in the carrier tray 40. When the telephone handset 12 is inserted into the tube housing 16, the handset clip 78 slides over the mouthpiece area of the handset 12. The top of the tube housing 16 forces the handset clip 78 down onto the handset 12, thereby locking the handset 12 in place. The mouthpiece area of the handset 12 is configured with a corresponding angle to provide a mating relationship with the handset clip 78. The locking section 60 also contains a cord opening 80 to allow passage of a telephone cord to a take-up reel (not shown). The take-up reel is located aft of the receptacle 10 in the armrest 22.

When the carrier tray 40 is in the rear portion of the tube housing 16, a spring biased locking clip 53 engages the locking section 60 to hold the carrier tray 40 in place. The locking clip 53 is the front portion of the carrier lock 52. On the bottom edge of the carrier lock 52, a hole 70 is bored to accept an axle 56 about which the carrier lock 52 may pivot. The carrier lock 52 is mounted at the aft portion of the tube housing by inserting a lock axle 56 through lock mounting holes 68 in the tube housing 16 and the hole 70 in the carrier lock 52. The lock axle 56 is inserted inside the coils of an axle spring 58. One edge of the axle spring 58 rests against the side wall 69 of the tube housing 16 and the other edge pushes against the side of the carrier lock 52. The force provide by the axle spring 58 holds the carrier lock 52 in a stable position between the side walls, 67 and 69, of the tube housing 16. On the opposite side of the carrier lock 52, a pivot spring 54 is connected to a pivot brace 72 on the side wall 67 of the tube housing 16 and the aft portion of the carrier lock 52. This causes the pivot spring 54 to force the carrier lock 52 in the down and locked position. Extending upwards from the carrier lock 52 is a rod indentation 76. This indentation 76 is designed to form a mating relationship to the end of a lock actuating rod The lock actuating rod 46 runs longitudinally along the top surface 48 of the tube housing 16. Rod connectors 74 attach the rod 46 to the housing 16. While one end of the rod 46 fits inside the indentation 76 in the carrier lock 52, the opposite end is connected to the release button 20. The rod 46 runs through the coils of a rod spring 44 so as to contact the rear of the button 20 at its front end and a rod connector 74 at its rear end. The release button 20 protrudes through the button opening 75 in the front face 14.

Along the left side of the housing top 48 at approximately the middle longitudinally is located a clip opening 47 in the form of a rectangular cut-out. This cut-out is positioned so that when the carrier tray is in the forward position, the handset clip 78 will be beneath the clip opening 47. In order to remove the handset 12 from the tube housing 16, the handset clip 78 must be force upward to allow the handset mouthpiece to pass beneath the clip 78. By locating the handset clip 78 beneath the clip opening 47, the handset clip 78 will bend through the clip opening 47 when the telephone handset 12 is removed from the tube housing 16.

In operation, the carrier tray 40 is designed to accommodate the telephone handset 12. The shape of the carrier tray 40 coincides with the shape of the opening 18 of the front face 14 to accept a handset 12. Again, the shape of the carrier tray 40 and opening 18 may be altered to accommodate a variety of telephone handsets without changing the spirit of the invention. Molded into the bottom side edges of the carrier tray 40 are the spring channels 50. These channels 50 allow the springs 42 to run beneath the carrier tray 40.

When the telephone handset 12 is inserted into the receptacle 10, the force pushing the handset 12 into the tube 10 pushes the carrier tray 40 towards the rear of the tube housing 16. This action stretches the springs 42 until the carrier tray 40 is locked in place by the carrier lock 52 at the rear of the tube housing 16. The receptacle 10 is of sufficient length that with the carrier tray 40 in this locked position, the telephone handset 12 will not extend beyond the front face 14. This position of the handset 12 presents a flush face on the armrest to the passenger. Depressing the release button 20 disengages the carrier lock 52, as will be described below, and the compression of the springs 42 forces the carrier tray 40 to slide forward along the tube housing 16. Movement of the carrier tray 40 is stopped when the front edge 66 of the carrier tray 40 contacts the back edge 64 of the front face 14. Movement of the carrier tray 40 to this position exposes a portion of the telephone handset 12 forward of the front face 14. This allows the passenger to grip the telephone handset 12 and completely remove it from the receptacle 10. When the handset 12 is removed, the cord is released from the cord reel (not shown) and travels through the receptacle 10. The passenger may then place calls desired until the handset 12 is replaced in the receptacle 10. Because the cord reel is spring loaded, the cord will rewind on the reel as the handset 12 is replaced in the tube 10.

The carrier tray 40 is held in the aft portion of the tube housing 16 by the locking mechanism 52. The passenger releases the carrier lock 52 by depressing the release button 20. When the release button 20 is depressed, the rod spring 44 and rod 46 are pushed toward the aft of the tube housing 16. The rod 46 pushes on the carrier lock 52, overcoming the holding force of the pivot spring 54 and causing the carrier lock 52 to rotate about the lock axle 56. This rotation raises the lock clip 53 off the top edge 60 of the carrier tray 40, allowing the force of the springs 42 to slide the carrier tray 40 to the front of the tube housing 16 as previously discussed.

Releasing the release button 20 will allow the force of the pivot spring 54 to lower the lock clip 53 back to the down position and ready the tube 10 to reaccept the handset 12. Reinsertion of the telephone handset 12 will force the carrier tray 40 aft and the lowered lock clip 53 will engage the top edge of the carrier tray 40, thereby locking the carrier tray 40 and handset 12 inside the tube housing 16.

Of course, numerous variations and modifications of the invention will become readily apparent to those skilled in the art. Accordingly, the scope of the invention should not be construed as limited to the specific embodiment depicted and described but rather, the scope is defined by the appended claims. The invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A telephone handset holder, comprising:
   a housing defining an elongated enclosed cavity with an opening at a first end, wherein said elongate cavity is configured to receive a telephone handset so that substantially the entire length of the handset is positioned within said cavity;
   a carrier tray movably mounted inside the housing so as to be movable between a rear position and a forward position within said cavity wherein said carrier tray is biased to move towards said forward position and wherein said carrier tray is configured to receive a telephone handset so that said telephone handset moves linearly along a longitudinal axis when said carrier tray moves between said rear and said forward positions;
   a locking mechanism, secured to the housing, said locking mechanism holds the carrier tray in said rear position of the housing such that a substantial portion of the telephone handset carried on the carrier tray is retained within said elongate enclosed cavity within the housing;
   a release mechanism connected to the locking mechanism such that, when activated, the release mechanism disengages the locking mechanism, allowing the carrier tray to move to said forward position within the housing, thereby exposing a first end of the telephone handset carried thereon out of said opening in said enclosed cavity; and
   a securing mechanism which securely holds said handset in said carrier tray and wherein said securing mechanism is configured to release said handset from said cavity when said carrier tray is in said forward position, in response to the user pulling said first end of said handset forward out of said housing.

2. The telephone handset holder of claim 1, wherein the housing is configured to fit into an armrest of a seat.

3. The telephone handset holder of claim 1, further comprising a spring mechanism connected to the carrier tray such that when the locking mechanism is not holding the carrier tray, said spring mechanism forces the carrier tray to the forward position in the housing.

4. The telephone handset holder of claim 1, additionally comprising a guide secured within the housing for a telephone cord.

5. The telephone handset holder of claim 1, wherein the release mechanism includes a button secured on an exterior surface of the housing so as to be accessible to a user, said button connected to the release mechanism so as to communicate release mechanism control forces from the user to said release mechanism, to thereby disengage the locking mechanism from the carrier tray.

6. The telephone handset holder of claim 1, wherein the locking mechanism includes a clip which contacts the carrier tray so as to secure said tray in a locked position in said rear position in the housing, and wherein activation of the release mechanism partially rotates a component of the locking mechanism, thereby raising said locking clip so as to discontinue its contact with said carrier tray.

7. The telephone handset holder of claim 1, wherein said securing mechanism comprises a pressure tab which is connected to said carrier tray and extends in a first direction and contacts the telephone handset such that, when said carrier tray is at said rear position of the housing, said pressure tab secures said handset within said housing and wherein said housing includes an opening position so that, when said carrier tray is at said forward position of said housing, said pressure tab is urged into said opening in said housing in response to said user pulling said first end of said handset out of said housing and thereby allows said handset to be removed from said housing.

8. A seat with an integrated telephone handset receptacle, comprising:

an armrest having a first and a second end and a top and a bottom surface;

a housing having an enclosed elongated cavity with an opening at a first end formed therein mounted within said armrest so as to be positioned between said top and said bottom surfaces with said opening positioned at said first end of said armrest, wherein said cavity is configured to receive through said opening a telephone handset so that substantially all of said handset is positioned within said enclosed cavity wherein said handset is linearly movable along a longitudinal axis within said cavity between a rear position and a forward position;

a lock mechanism connected to the housing, said lock mechanism securing the handset within the cavity when said handset is in said rear position; and a release mechanism, connected to the lock mechanism and responsive to control of a user, said release mechanism causing said lock mechanism to release the handset so that said handset can move linearly along the longitudinal axis from said rear position to the forward position wherein a portion of said handset extends and exposes out of said opening;

a securing mechanism which engages with said handset to securely retain said handset in said cavity when said handset is in said rear position and wherein said securing mechanism retains said handset in said forward position until the user grasps said exposed portion of said handset and fully removes said handset from said cavity; and wherein a carrier tray movably mounted inside the cavity and configured to receive the telephone handset and wherein, in a handset storage configuration, the locking mechanism contacts said carrier tray and secures said tray in said rear position in the housing such that a substantial portion of the telephone handset carried on said carrier tray is retained within the housing.

9. A telephone handset receptacle as defined in claim 8 wherein, the housing is configured to be mounted in the armrest of a seat.

10. A telephone handset receptacle as defined in claim 9, wherein when mounted in the armrest of the seat, the housing includes a front face on a forward end of said housing, wherein said front face is substantially flush with a forward end of said armrest.

11. A telephone handset receptacle as defined in claim 8, wherein the housing includes a front face located on a forward end of said housing, wherein said face includes an aperture having a periphery configured to receive the telephone handset therethrough in mating relationship, and wherein said aperture in said face and said telephone handset include mating features in their configuration which limit orientations in which said handset can be inserted through said aperture.

12. A telephone handset receptacle as defined in claim 11, wherein the telephone handset is a cellular telephone.

13. A telephone handset receptacle as defined in claim 8, wherein the release mechanism includes a control button secured on an exterior surface of said housing so as to be accessible to a user, said button connected to the release mechanism so as to communicate release mechanism control forces from the user to said release mechanism, to thereby disengage the locking mechanism from securing the telephone handset.

14. A telephone handset receptacle as defined in claim 13, wherein the housing includes a front face located on a forward end thereof, wherein said face includes an aperture having a periphery configured to receive the telephone handset therethrough, and wherein the control button is positioned on said front face.

15. A telephone handset receptacle as defined in claim 8 wherein, in the handset storage configuration, the body of the handset is retained entirely within the housing.

16. A telephone handset receptacle as defined in claim 8, further comprising a spring mechanism connected to the carrier tray such that when the locking mechanism is disengaged from the carrier tray, said spring mechanism forces the carrier tray toward the forward position in the housing.

17. A telephone handset receptacle as defined in claim 8, wherein the locking mechanism includes a clip which contacts the carrier tray so as to secure said tray in locked position at the rear position in the housing, and wherein activation of the release mechanism partially rotates a component of the locking mechanism, thereby raising said locking clip so as to discontinue its contact with said carrier tray.

18. The telephone handset holder of claim 8, wherein the carrier tray includes a pressure tab which contacts the telephone handset such that, when said carrier tray is in said rear position in the housing, said pressure tab secures said handset within said housing and when said carrier tray is at the forward position in the housing, said pressure tab allows said handset to be removed from said housing.

* * * * *